(12) United States Patent
Hanina

(10) Patent No.: US 9,020,833 B2
(45) Date of Patent: Apr. 28, 2015

(54) METHOD AND APPARATUS FOR SOCIAL NETWORK UPDATES BY ACTIVITY RECOGNITION

(75) Inventor: Adam Hanina, New York, NY (US)

(73) Assignee: AIC Innovations Group, Inc., New York, NY (US)

( * ) Notice: Subject to any disclaimer, the term of this patent is extended or adjusted under 35 U.S.C. 154(b) by 84 days.

(21) Appl. No.: 13/216,099

(22) Filed: Aug. 23, 2011

(65) Prior Publication Data

US 2013/0055300 A1 Feb. 28, 2013

(51) Int. Cl.
G06Q 30/00 (2012.01)
G06T 7/00 (2006.01)
H04H 60/32 (2008.01)
G06Q 30/02 (2012.01)
H04H 60/33 (2008.01)

(52) U.S. Cl.
CPC .......... H04H 60/32 (2013.01); G06Q 30/0208 (2013.01); G06Q 30/0224 (2013.01); G06T 2207/10016 (2013.01); H04H 60/33 (2013.01)

(58) Field of Classification Search
USPC ..................................... 705/14.11
See application file for complete search history.

(56) References Cited

U.S. PATENT DOCUMENTS

| 7,095,416 B1 | 8/2006 | Johns et al. | |
|---|---|---|---|
| 7,643,658 B2 | 1/2010 | Kilner et al. | |
| 2006/0212355 A1* | 9/2006 | Teague et al. | 705/14 |
| 2009/0319388 A1* | 12/2009 | Yuan et al. | 705/26 |
| 2010/0005105 A1 | 1/2010 | Zhang et al. | |
| 2010/0030355 A1* | 2/2010 | Insolia et al. | 700/97 |
| 2010/0125490 A1 | 5/2010 | Kiciman et al. | |
| 2011/0028160 A1 | 2/2011 | Roeding et al. | |
| 2011/0125561 A1* | 5/2011 | Marcus | 705/14.15 |
| 2011/0184792 A1 | 7/2011 | Butcher et al. | |

OTHER PUBLICATIONS

Mintchell, "Exploring the Limits of Machine Vision", Automation World, Oct. 1, 2011.*
Strong, "Where Can You Find Your Customer", Atlas Institute, 2007, found on line at atlassolutions.com/wwdocs/user/atlassolutions/en-us/insights/dmi-CombinedImpactSearchDisplay.pdf.*
CenceMe, You Seventh Sense from the Apple App Store, pp. 1-5, Aug. 18, 2011.
Kyu-Jin Kim et al., Dementia Wandering Detection and Activity Recognition Algorithm Using Tri-Axial Accelerometer Sensors, IEEE Abstract, pp. 1, Dec. 20, 2009.

(Continued)

Primary Examiner — John G Weiss
Assistant Examiner — Scott C Anderson
(74) Attorney, Agent, or Firm — Gordon Kessler

(57) ABSTRACT

A method and apparatus for engaging consumers in the performance of predetermined action. The method comprises the steps of determining performance of a predetermined action, broadcasting confirmation of performance of the predetermined action, and providing incentive based upon the broadcasting. The predetermined action may include comprises consuming a consumable item. The broadcasting may be performed via a social networking site, and wherein the broadcasting further may include transmitting a video of the performance of the predetermined action. The incentive may comprise a monetary incentive to the performer of the action, to one or more peers of the performer of the action viewing the broadcast, or to one or more peers of the performer of the action upon performance of the predetermined action by the one or more peers.

23 Claims, 4 Drawing Sheets

(56) References Cited

OTHER PUBLICATIONS

Ming-Ching Chang et al., Group Level Activity Recognition in Crowded Environments across Multiple Cameras, IEEE Abstract, pp. 1, Aug. 29, 2010.

IEEEXplore social network activity recognition search results. pp. 1-4, Aug. 18, 2011.

Hao Tian et al., Wearable activity recognition for automatic microblog updates, IEEE Abstract, pp. 1, Jul. 14, 2009.

Alessandro Vinciarelli et al., Social signal processing: Survey of an emerging domain, pp. 1-2, May 2008.

Emiliano Miluzzo et al. Sensing meets mobile social networks: The design, implementation and evaluation of the CenceMe application, pp. 337-350, 2008.

Non-Final Office Action from PTO, (U.S. Appl. No. 13/369,757), (Dec. 21, 2012), 1-19.

PCT Search report and written opinion, (PCT/US12/051659), (Nov. 2, 2012), 1-7.

Daily Free Games, "Ghost Man Advanced Info", Dec. 21, 2008, on line at dailyfreegaes.com/games/arcade-games/ghost-man-advanced.html.

Katusak, "Incentives, Motivation and Workplace Performance: Research and Best Practices", International Society for Performance Improvement, 2002, found online at loyaltyworks.com/incentive-program-research-articles/ispifulpdf.pdf.

Ijsselmuiden, Joris, and Stiefelhagen, Rainer. "Towards High-Level Human Activity Recognition through Computer Vision and Temporal Logic." *KI'10 Proceedings of the 33$^{rd}$ annual German conference on Advances in artificial intelligence.* (2010) pp. 426-435.

Turaga, Paul; Chellappa, Rama; Subrahmanian, V. S.; and Udrea, Octavian. "Machine Recognition of Human Activities: A survey." *IEEE* (2008).

Gomez-Conde, Ivan; Olivieri, David; Vila, Xose Anton; and Orozco-Ochoa, Stella. "Simple Human Gesture Detection and Recognition Using a Feature Vector and a Real-Time Histogram Based Algorithm." *Journal of Signal and Information Processing.* (2011) vol. 2, pp. 279-286.

Aggarwal, J. K. and Ryoo, M. S. "Human Activity Analysis: A review." *ACM Computing Surveys (CSUR).* (Apr. 2011) vol. 43, Issue 3, Article No. 16.

Office Action dated Mar. 13, 2013 in U.S. Appl. No. 13/369,757, pp. 1-19.

Niebles, J. .C, Wang, H., and Fei-Fei, L. *Unsupervised Learning of Human Action Categories Using Spatial-temporal Words.* Int J Comput Vis. Mar. 16, 2007, pp. 1-20.

Final Office Action dated Aug. 23, 2013 in U.S. Appl. No. 13/369,757, pp. 1-18.

Office Action dated May 19, 2014 in U.S. Appl. No. 13/369,757, pp. 1-13.

\* cited by examiner

METHOD AND APPARATUS FOR SOCIAL NETWORK UPDATES BY ACTIVITY RECOGNITION

FIELD OF THE INVENTION

This invention relates generally to the monitoring of individuals performing one or more predetermined activities, and more particularly to automated monitoring of one or more individuals performing one or more actions related to one or more items. The results of such monitoring may be employed to update status in a social networking context, such as updating social network status in accordance with the one or more actions, to update a status in a live social or other situation, or to otherwise broadcast the results of the monitoring. Incentives may also be provided in accordance with the updating social network or live social status in accordance with the one or more actions.

BACKGROUND OF THE INVENTION

Advertising of products has generally been a passive endeavor. The manufacturer or salesperson advertises goods for sale, and the consumer purchases. More recently, viral marketing has allowed for the distribution of advertising material to a vast network of individuals. In the case of social networking sites, peers of a particular user may be targeted as being associated with a particular user. However, in any of these scenarios, the participant and peers are still uninvolved viewers of advertising content.

Therefore, it would be desirable to provide a method and apparatus that overcome the drawbacks of the prior art and provides more active participation of users in advertising.

SUMMARY OF THE INVENTION

In accordance with the invention, direct observation of activity of a subject, such as the watching of a consumer consuming a consumable item, may be provided. Such direct observation may be provided through activity recognition or other machine and computer vision techniques. Upon such visual confirmation of such an action, a broadcast or other action indicating that the subject has performed the action, such as consuming of a consumable item may be provided. Other actions may include drinking, eating wearing playing, purchasing or the like. Such broadcasting may be provided as an automatic or other update to a profile on a social networking site, email or direct text messages to one or more indicated individuals, announcement in a particular location, such as through the user of a publicly-viewable display or electronic billboard or the like. Such broadcasting may further include broadcasting a video recording of the subject performing the confirmed action, and may further comprise posting such video to a social networking site. Upon confirmation of such activity, such broadcast, or such posting, some benefit or other incentive or reward may be provided to the subject. Such benefits may include points, monetary rewards, product rewards or the like.

In accordance with one or more particular embodiments of the present invention, a participant may employ an activity recognition algorithm employing machine vision on a mobile communication device for determining the performance of one or more predetermined actions. Upon recognition of performance of such an action, one or more social media network statuses may be updated, and a video file including a sequence of images showing performance of the action may be provided. Upon update of the social media network status, one or more incentives related to the action may be provided to the participant.

In accordance with one or more additional embodiments of the present invention, a participant may employ an activity recognition algorithm employing computer vision for determining the performance of one or more predetermined actions. Upon recognition of performance of such an action, a broadcast of a video clip of the action being performed may be shown in any desired location. The location may comprise a display in a public location, over television or the like broadcast to multiple sites, or though contact with one or more predetermined individuals. The broadcast may comprise one or more information displays, such as through the use of animations representative of one or more users or actions, and may further include information about the consumable item, or action taken in relation thereto. Further information may be provided, including statistics related to consumption of the consumable for the particular individual, or across groups of individuals. Furthermore, users may selectively opt in to allow for various facial recognition techniques to be used, thus allowing one or more images to be captured of the individual user, of a group of individuals in which the individual user is the primary actor, or in which the individual is one of a group of participants, thus automatically detecting and logging activity. Upon such broadcast, one or more incentives related to the action may be provided to the participant, such as or more promotional items related to the performed action.

In a more particular embodiment of the invention, the participant may be encouraged to consume an item in view of a web camera on their mobile device, or other appropriate computing device. The device may employ an activity recognition algorithm employing computer vision for determining that the participant has consumed the item. Upon recognition of the consuming of the item, one or more social media network statuses may be updated, and a video file including a sequence of images depicting consumption of the item may be provided. One or more trends of consumption may be tracked, as in the number of times a particular item has been consumed. Upon update of the social media network status, one or more incentives related to the consuming of the item may be provided to the participant.

In U.S. patent application Ser. No. 12/620,686 filed Nov. 18, 2009 titled Method and Apparatus for Verification of Medication Administration Adherence; Ser. No. 12/646,383 filed Dec. 23, 2009 titled Method and Apparatus for Verification of Clinical Trial Adherence; Ser. No. 12/646,603 filed Dec. 23, 2009 titled Method and Apparatus for Management of Clinical Trials; and Ser. No. 12/728,721 filed Mar. 22, 2010 titled Apparatus and Method for Collection of Protocol Adherence Data, the entire contents of each of these applications being incorporated herein by reference, a system and method have been proposed that allow for complete control and verification of adherence to a prescribed medication protocol or machine or apparatus use in a clinical trial or other setting, whether in a health care provider's care, or when self administered in a homecare situation by a patient. The present invention suggests extension of this activity recognition sequence to various social and other settings, providing a system for publicizing recognition of the activity sequence, and for providing one or more incentives to the participant upon confirmation of performance of such activity.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described making reference to the following drawings in which like reference numbers denote like structure or steps.

Figure 1:
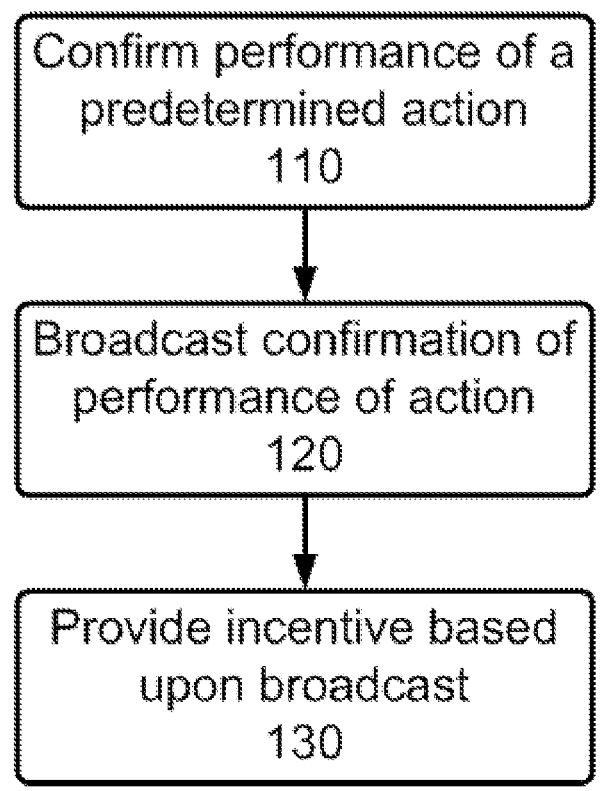
FIG. 1 is a flowchart diagram depicting an embodiment of the invention.

Referring first to FIG. 1, a flowchart diagram depicting first embodiment of the present invention is shown. At step 110, a predetermined action of a participant is confirmed. In accordance with various embodiments of the present invention such confirmation is preferably determined in accordance with one or more computer vision or activity recognition techniques, and may employ an application on a mobile device using a web camera with a display, a more general web camera and a public display, or the like. After such recognition, at step 120, a confirmation of the performance of the predetermined action is broadcast. It is anticipated that such broadcast may take any form, such as electronic dissemination, location based notifications, video presentations, text messaging or images, audio descriptions or other audio information and the like. Finally, after confirmation of such broadcast, the participant may be provided with an incentive. The incentive may be monetary or otherwise, and may act to encourage the participant or others to perform similar actions. Thus, the incentive may also be provided to others viewing the broadcast. Such incentives may be provided directly to one or more individuals, or may comprise a lottery system, thus allowing for multiple individuals to potentially win a larger incentive prize.

Figure 2:
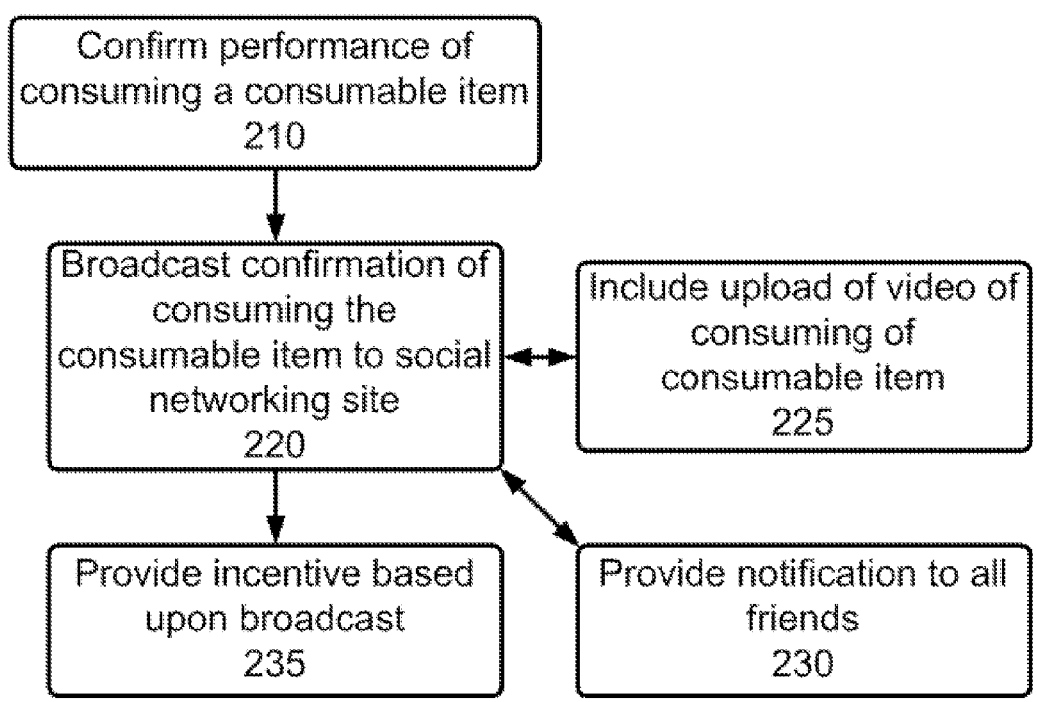
FIG. 2 is a flowchart diagram depicting an alternative embodiment of the invention in a social media environment.

Referring next to FIG. 2, a more particular embodiment of the invention will be described. In FIG. 2, at step 210, performance of consuming of a consumable item by a participant is confirmed. In accordance with various embodiments of the present invention such confirmation is preferably determined in accordance with one or more machine vision or activity recognition techniques. Analysis may be employed in order to determine a confidence of the system that the user has actually consumed the consumable item. This confidence level may be determined based upon various information, such as time on task, movements by the user, shadows, poor lighting, or any other environmental or other factor that may decrease the confidence with which an automated computer vision system may confirm consuming of the consumable item. For example, if an individual is drinking a cup of liquid, reactions to the tilting of the individual's head or movement of the cup relative to the individual's head or mouth may give clues as to whether the individual is actually consuming the consumable liquid.

In particular, many factors may come into play regarding the confidence with which a determination of consumable item consumption may be made. Thus, the detection of certain actions or circumstances of administration by the inventive system may be considered in determining a confidence of consumption. Various of these factors may be tracked, and comprise a time sequence of behavioral markers by the user that may be used in aiding determination of consumption of the consumable item. Furthermore, machine learning of trends may be provided to understanding one or more variables that may aid in proper determination of consumption. Various decision fusion learning systems may be employed in order to aid in making determinations regarding the various characteristics that may be reviewed and used to make such consumption determination decisions.

Additionally, in order to further aid in consumption determination, audio information may further be employed. Thus, in addition to visual information being used to determine action, signature sounds corresponding to one or more particular actions may be employed to either determine action, or aid in improving a confidence that an action was taken that was observed visually. Thus, for example, if opening and drinking a soda is the desired action, the sound of the opening can or bottle may be used in addition to the visual captured action in order to determine opening the bottle. Similar audio signatures may be employed to determine opening of a wrapper, ripping of a paper cover, or any other desired trackable action that includes a distinctive audio counterpart. Further, depending on environmental factors, sounds such as a swallowing sound, breathing, talking or other audible information may be used to supplement a determination originally made based upon visual confirmation.

After such recognition, at step 220, confirmation of the consuming of the consumable item by the participant is broadcast to one or more social networking sites. In accordance with an embodiment of the invention, this broadcasting may include uploading a video clip of the participant consuming the consumable item at step 225. Such video may comprise actual images of the participant, animation or rotoscoping based thereupon, or otherwise serving images or audio associated with the participant. Additionally, a notification may be provided to one or more friends of the participant on the social networking site that such consuming of the consumable item has taken place at step 230. Finally, at step 235 an incentive may be provided to the participant based upon confirmation of the broadcast. Additional incentives may be provided upon various friends responding to the notification of the broadcast, viewing of the video by a friend, or the like. Such incentives may also be provided to those friends. These friends may also be requested or offered to use the system via an invitation to download a particular app, or link to a website. Such consuming may further comprise one or more drinking of a beverage, eating a food, or even wearing a particular clothing type, brand, style, etc. Thus, a user trying on a particular clothing at a store, for example, may result in a broadcast of the wearing event, and perhaps distribution of a discount coupon to the individual and to the individual's friend or other recipients of the broadcast. Such consuming may additionally comprise one or more individuals watching, for example a movie or the like. Facial recognition techniques known to those of ordinary skill in the art may be used to determine individuals watching a show or movie, while time stamping, etc. may be employed with additional timing and channel information to confirm watching of a particular program.

Figure 3:
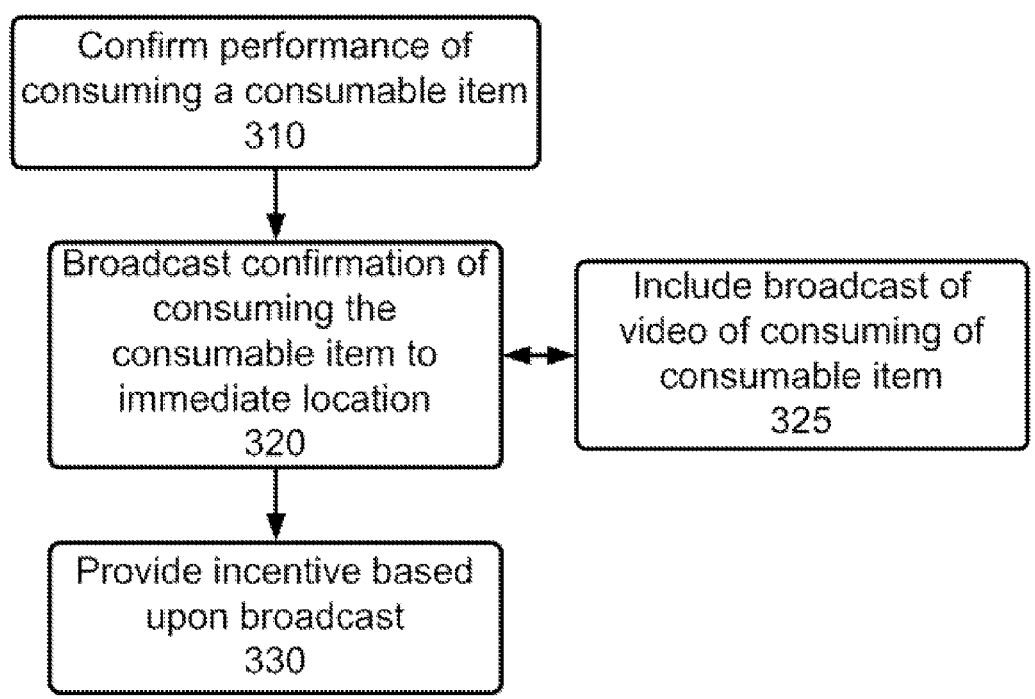
FIG. 3 is a flowchart diagram depicting yet another embodiment of the invention in a live participation environment.

Referring next to FIG. 3, an embodiment of the invention is described to be employed in a live location. First, at step 310, performance of consuming of a consumable item by a participant is confirmed. In accordance with various embodiments of the present invention such confirmation is preferably determined in accordance with one or more machine vision or activity recognition techniques. After such recognition, at step 320, confirmation of the consuming of the consumable item by the participant is broadcast to the immediate location about the participant. Such immediate location may be at a home, public location, restaurant bar, or other place where people congregate. Such broadcasting is preferably employs presentation of a video of the participant consuming the consumable item at step 325, and may be accompanied by audio, messaging, or the like to further advertise the broadcast. If video is not available, these other methods of broadcasting may be employed alone. Finally, at step 330, an incentive is provided based upon the broadcast. The incentive may be directed to the participant or others in the location of the broadcast.

In accordance with one or more embodiments of the present invention, and as set forth in each of the above scenarios, the direct observation of a consumable includes an automated visual confirmation that a consumer has consumed a product or service. This consuming may be performed in return for some benefit. Further, evidence of this consuming may be broadcast to others via a number of methods, such as through a live video at a particular location, broadcasting via a social networking site, or the like. Incentives and rewards may be provided to the participant, or others viewing the participant. On each of these scenarios, behavior shaping (i.e. influencing the behavior) of the user and other friends or viewers of the participant is accomplished. First, the peer network of the participant is made aware of the actions of the participant on a one-to-many basis. Second, a monetary or other desirable incentive may be provided to the participant or others related to the product, such as a coupon, discount on a next purchase, free products, or even an incentive via the social network for the user, or perhaps one or more friends of the user. Finally, a gaming aspect of the situation is presented in which the steps of consumption may be integrated into a game or the like, accumulating points or other desirable scoring markers, thus providing an incentive to consume additional consumable items, and to provide positive reinforcement for performing various actions. Such actions thus shape behavior in a manner likely to increase consumption of the consumable.

In each of the above-described scenarios, it is contemplated that consumption of a consumable is determined. In accordance with an embodiment of the invention, a three step process may be employed in order to make such a determination. Thus, the task of determining consumption may be broken down to a small number of easy to determine tasks. The sum sequential performance of these tasks will then be determined to be evidence of completion of the task. If the case of drinking a soda, for example, a first step may be identification of the user, a second step may be identification of the consumable, and a third step may be identification of consuming the consumable. Of course, any number of steps may be employed. This third (or any other) step may be further broken down into one or more sub-steps based upon the type of consumable. For example, drinking from a bottle may be broken into the steps of determining that the bottle is against the lips of the user, determining that the bottle has been lifted up to a position where liquid may pour from it, and determining that the liquid level in the bottle is lowering. For a consumable such as a pill, candy, or other edible object, these sub-steps may comprise confirming the consumable in the mouth of the user, confirming closing of the mouth, and then confirming an empty mouth. In the case of visual confirmation of wearing of one or more clothing items, a participant may be asked to stand in front of a screen with an integrated camera or the like. Additional steps may be described or required, such as asking the participant to hold up their hand for up to four seconds, for example, to indicate a desire to opt-in to an application, or to log this particular activity. Further, voice or other activation of the system may be employed to allow for logging of a current activity. Any such steps may be employed as appropriate given the type of consumption to be determined.

As is noted above, one important step may be the identification of a product to be consumed by the user. Such identification may take place using any known identification system, but may also employ an inventive system for making a determination of the object in accordance with a web camera on a mobile device of a user, a camera covering a large area of a public or private space, or other desired location. Thus, the system is able to be provided with an object to be matched, and then search through a particular location to find and identify such an object. Once discovered, when one or more images or video of the consumption of the consumable, the object may be highlighted or otherwise given prominence in the display so that one or more users viewing the display will be made immediately aware of the product in question. Thus a can of desired beverage or the like may be highlighted or otherwise emphasized in a display, or a logo or other identifying feature of the can (or other consumable item) may be highlighted or magnified to give prominence during a broadcast. Furthermore, one or more overlaid statements or advertising images may be employed to further highlight the item of logo, or to otherwise provide additional exposure and advertising to be viewed or heard in accordance with such a broadcast.

Figure 4:
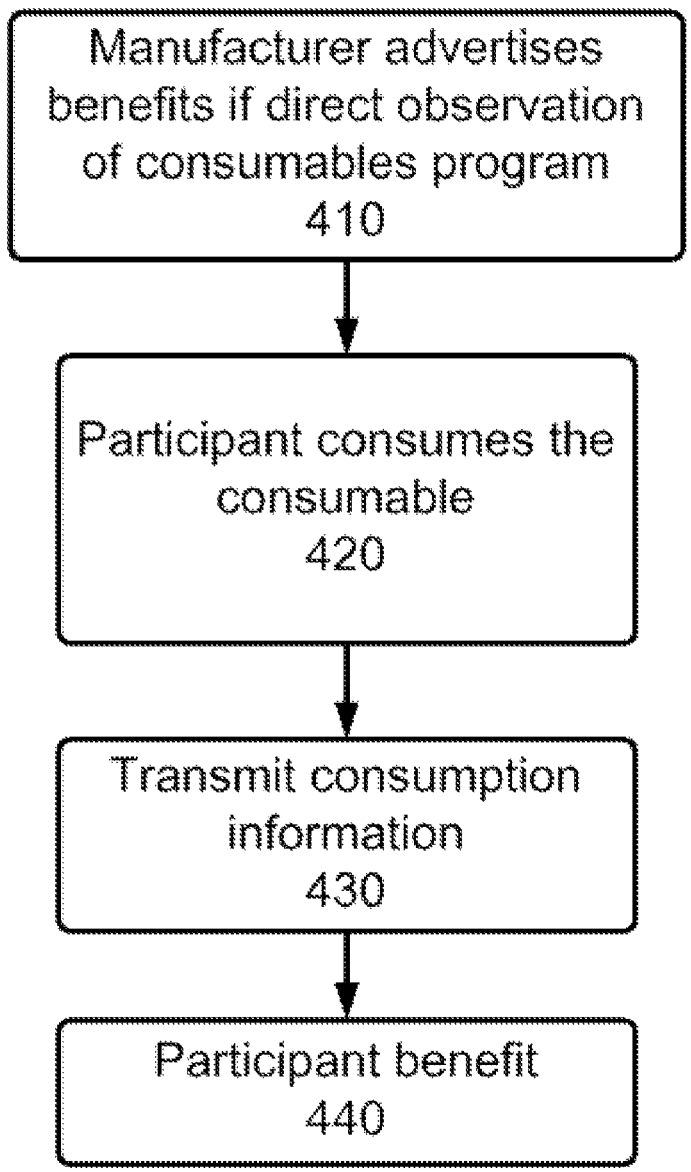
FIG. 4 is an overall process flow according to an embodiment of the invention.

Referring next to FIG. 4, a flowchart diagram depicting process flow in an overall system employing one of the scenarios noted in FIGS. 1-3 is described. As is show in FIG. 4, first a manufacturer or other interested party may advertise the benefits of the direct observation of consumables program at step 410. Such advertising may take place online or offline media. Incentives to join and participate in the program may be described as points for discounts on future purchases, or redemption for free merchandise, a lottery system for free merchandise from among those reaching a certain point threshold, a general points/credit system based upon the number of friends or others who see you consuming the consumable, and incentives for your network, such a coupons for an online network, or free consumables for a live network, or the like. Then, at step 420, a participant initiates the process of consuming the consumable in a manner that is trackable by a system provided for such tracking at step 420. Thus, the user may be asked to perform a short number of steps in view of a web camera included with a video phone or other mobile device, or other apparatus available for recording and analyzing participant actions. The user may first be asked to log into the system, such as by facial recognition, or by password or other identifying system, such as, for example, a biometric recognition system, or a log in via an existing network, such as a social network account or the like. Such identification system may be employed in order to avoid any malicious intent on the part of the user, and indeed any other identification verification may be employed. Next, the participant may be asked to hold up the consumable to the camera so that the consumable may be identified. Finally, the participant may be asked to consume the consumable (or wear a wearable item, etc.). Such consumption may be requested according to a particular format so that the system is able to confirm that the participant has performed the desired action. After such consumption, at step 430, data related to such consumption is transmitted to a remote location, or stored locally, in accordance with the desired network. In addition to processing and sending a video, mini-video, series of thumbnail images, animation or the like, and preferably highlighting or otherwise identifying the consumable product to make it stand out and differentiate it from other objects and backgrounds in the image, time and date of the action may be recorded and transmitted, along with participant identification, and an indication of consumption logged. Once transmitted, this information may further be provided to one or more social networks, friends who have performed similar tasks, or who have been entered in a game to track such consumption, and the like. Finally, at step 440, the participant may receive one or more benefits upon confirmation of consumption and transmission of the consumption information. Thus, points may be added to the participant's account, peers in either an online or offline network may be notified of receipt of the incentive and be shown the consumption, via video or other messaging, such as texting, email, audio or the like. The participant may receive monetary incentives, such a cash back, or discounts on future purchases. Additionally, peers of the participant may receive one or more incentives in order to encourage similar consumption, or simply for viewing the broadcast of consumption by the participant. Additional features such as encouragement upon completion of tasks or watching of broadcasts may be provided, including automated applause, or other visual identifiers related to completion of a task. Thus, for example, upon consumption of an item, indications may be provided adjacent the mouth of the participant related to the consumed item. Any other type of reinforcement may be provided.

In accordance with an alternative embodiment of the present invention, a dashboard may be provided to a program manager to review one or more accounts for one or more participants, thus determining a number of times the user has consumed the consumable, and may allow for determinations of whether various marketing or other incentives increase such consumption. Additionally, it may be possible to determine whether the action of consumption by an individual influences consumption by other individuals in the user's social network, immediate physical location, or anyone otherwise knowledgeable of such consumption in accordance with any of the methods described above. Thus, "peer tracking" may be employed in order to test the viral expansion of a particular campaign, or the like. By seeing who clicks through a particular broadcast, movement of the campaign through one or more peer networks may be determined. Various additional diagnostics may be provided as appropriate, and including one or more features allowing for adjustment of various marketing or incentive programs in accordance with one or more reported statistics, and may allow for the review of changes in behavior for one or more users based upon changes in incentive. Changes in such incentives may be based upon any desirable statistic, and may be applied to one, many or classes of individuals based upon demographic, location, or other classification metrics. Thus, for example, various aged individuals in certain locations may be provided with an incentive, while others in different locations may receive another. Further heavy consumers may receive further incentive, or the like. In addition to reviewing such changes in user behavior, monitoring may be provided to determine whether recurring consumption is taking place in a position in which it should not. For example, such a system may determine that a particular individual has consumed more than a predetermined number of drinks, thus notifying to stop such activity, or provide other information to the user that may be appropriate given the determined action. Further such a system may also initiate further actions automatically, such as requesting a taxi, thus allowing for encouragement of safe driving. Various other actions may be preprogrammed by the participant form one or more situations, such as calling or otherwise alerting a friend or family member or the like.

It is therefore anticipated that upon incenting participants to consume consumable items in such a manner, peers in their network will know about this consumption, and will similarly be incented to also consume the consumable in a similar manner. Cross-selling of related consumables or other products may also be provided. As noted above, the ability to broadcast such consumption via one or more well known social networking sites has the potential to allow for a limitless number of peers to be reached, each becoming a participant and reaching out to their network as well. It is this network effect that is anticipated to greatly increase consumption of such a consumable product.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for broadcasting performance of an action by a broadcasting system, comprising the steps of:
    predefining a sequence of steps to be performed by a performer, and to be captured by an image capture device camera comprising proper consumption of a product;
    displaying on a display one or more images of the performer performing the predefined sequence of steps as captured by the image capture device camera;
    confirming the identity of the product through object recognition based upon one or more images captured by the image capture device camera;
    determining performance of the predefined sequence of steps by a performer by confirming each step in the sequence of steps captured by the image capture device camera, and therefore confirming a predetermined action of proper consumption of the product by a computer processor in accordance with machine vision activity recognition;
    broadcasting confirmation of performance of the predetermined action by a broadcast transmission system associated with the computer processor to one or more peers located remotely to the performer;
    providing incentive to the participant based upon the broadcasting; and
    broadcasting the provided incentive by the broadcast transmission system to the one or more peers located remotely to the performer.

2. The method of claim 1, wherein the predetermined action comprises consuming a consumable item.

3. The method of claim 1, wherein the broadcasting is performed via a social networking site.

4. The method of claim 3, wherein the broadcasting further comprises transmitting a video of the performance of the predetermined action.

5. The method of claim 1, wherein the broadcasting is performed to a publicly-viewable display.

6. The method of claim 1, wherein the incentive comprises a monetary incentive to the performer of the action.

7. The method of claim 1, wherein the incentive comprises an incentive to one or more peers of the performer of the action viewing the broadcast.

8. The method of claim 1, wherein the incentive comprises an incentive to one or more peers of the performer of the action upon performance of the predetermined action by the one or more peers.

9. A computer program stored on a non-transitory computer readable medium, the computer program causing a general purpose computer to perform the steps of:
predefining a sequence of steps to be performed by a performer, and to be captured by an image capture device camera comprising proper consumption of a product;
displaying on a display one or more images of the performer performing the predefined sequence of steps as captured by the image capture device camera;
confirming the identity of the product through object recognition based upon one or more images captured by the image capture device camera;
determining performance of the predefined sequence of steps by confirming each step in the sequence of steps captured by the image capture device camera, and therefore confirming a predetermined action of proper consumption of the product by a computer processor in accordance with machine vision activity recognition;
broadcasting confirmation of performance of the predetermined action by a broadcast transmission system to one or more peers located remotely to the performer;
providing incentive based upon the broadcasting; and
broadcasting the provided incentive by the broadcast transmission system to the one or more peers located remotely to the performer.

10. The computer program of claim 9, wherein the step of determining performance of the predefined sequence of steps further comprises confirming the performance of each of the sequence of steps through machine vision activity recognition in accordance with one or more images captured by the image capture device camera.

11. The computer program of claim 9, wherein the broadcasting is performed via a social networking site.

12. The computer program of claim 11, wherein the broadcasting further comprises transmitting a video of the performance of the predetermined action.

13. The computer program of claim 9, wherein the broadcasting further comprises the step of transmitting the material to be broadcast to a publicly-viewable display.

14. The computer program of claim 9, wherein the step of providing the incentive further comprises the step of providing a monetary incentive to the performer of the action.

15. The computer program of claim 9, wherein the step of providing the incentive further comprises the step of providing an incentive to one or more peers of the performer of the action viewing the broadcast.

16. The computer program of claim 9, wherein the step of providing the incentive further comprises the steps of:
determining performance of the predetermined action by one or more peers of the performer of the action; and
providing an incentive to the one or more peers upon determination of performance of the predetermined action thereby.

17. A system for broadcasting performance of an action by a broadcast system, comprising:
an image acquisition system acquiring an image of a participant performing an action comprising a predetermined sequence of steps indicative of consumption of a consumable item to be performed by the participant;
a display displaying the one or more images acquired by the image acquisition system during acquisition thereof of the participant performing the predetermined sequence of steps;
a processor analyzing the acquired image received from the image acquisition system of the participant performing the predetermined sequence of steps to confirm the identity of a product through object recognition, determining whether the participant has performed the predetermined sequence of steps by confirming each step in the sequence captured by the image acquisition system, thereby confirming a determined action, including proper consumption of the product action in accordance with machine vision activity recognition; and
a transmission system broadcasting confirmation of performance of the predetermined action to one or more peers located remotely to the participant;
the processor providing to the participant an incentive based upon the broadcasting; and
the transmission system broadcasting the provided incentive transmission system to the one more peers located remotely to the participant.

18. The system of claim 17, wherein the broadcasting is performed via a social networking site.

19. The system of claim 18, wherein the broadcasting further comprises transmitting a video of the performance of the predetermined sequence of steps.

20. The system of claim 17, further comprising a publicly-viewable display for receiving the broadcast confirmation of the performance of the predetermined, sequence of steps and for displaying the broadcast confirmation.

21. The system of claim 17, wherein the incentive comprises a monetary incentive.

22. The system of claim 17, wherein the processor further determines one or more peers of the performer of the predetermined sequence of steps viewing the broadcast, and provides an incentive thereto.

23. The system of claim 17, wherein the processor further determines performance of the predetermined sequence of steps by one or more peers of the performer of the action, and wherein the system provides an incentive to the one or more peers upon determination of performance of the predetermined action thereby.

* * * * *